(12) United States Patent
Iyer et al.

(10) Patent No.: US 6,593,768 B1
(45) Date of Patent: Jul. 15, 2003

(54) DUAL TERMINATION SERIAL DATA BUS WITH PULL-UP CURRENT SOURCE

(75) Inventors: Venkat Iyer, Beaverton, OR (US); Michael J. Pennell, Phoenix, AZ (US); John T. West, Beaverton, OR (US); Mitchell Beck, Phoeniz, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/442,857

(22) Filed: Nov. 18, 1999

(51) Int. Cl.$^7$ .......................... H03K 17/16; G06F 13/00
(52) U.S. Cl. ........................ 326/30; 326/86; 326/90; 327/108; 710/103; 710/100
(58) Field of Search .................... 326/30, 86, 90, 326/83; 327/108; 710/100, 302, 305, 313

(56) References Cited

U.S. PATENT DOCUMENTS 5,680,065 A * 10/1997 Park ........................... 326/86
5,781,028 A * 7/1998 Decuir ........................ 326/30
6,256,682 B1 * 7/2001 Gudan et al. .................. 710/14
6,279,060 B1 * 8/2001 Luke et al. .................... 710/64
6,415,342 B1 * 7/2002 Wahl et al. .................. 710/100

OTHER PUBLICATIONS

Universal Serial Bus Specification 2.0 (draft 0.79), Oct. 5, 1999, p. 151.*

* cited by examiner

Primary Examiner—Michael Tokar
Assistant Examiner—Vibol Tan
(74) Attorney, Agent, or Firm—Blakley, Sokoloff, Taylor & Zafman LLP

(57) ABSTRACT

An improved USB connection is disclosed that includes a pair of host parallel resistors connected to the USB connection at the host termination and a pair of peripheral parallel resistors connected to the USB connection at the peripheral termination. During high speed operation, the parallel resistors are switched to ground. Another aspect of the present invention is a voltage pull up apparatus for a USB connection. The apparatus includes a pull down resistor connected to the USB connection, a trickle current source attached to the USB connection, and a boost current source attached to the USB connection.

19 Claims, 5 Drawing Sheets

DUAL TERMINATION SERIAL DATA BUS WITH PULL-UP CURRENT SOURCE

BACKGROUND OF THE INVENTION

1. Field of the Invention

The present invention relates to bi-directional, high-speed serial data links, and more particularly, to an enhanced high speed data link that has dual parallel termination and disconnect detection.

2. Background Information

The Universal Serial Bus (USB) is a cable bus that supports data exchange between a host computer (USB host) and a wide range of simultaneously accessible peripherals (USB devices). The terms USB devices, USB peripherals, or simply peripheral device are synonymous and cover any device that is connected to a USB cable bus and is not a USB host or hub. The USB physical interconnect is a tiered-star topology. A hub is at the center of each star. A USB cable is used to make the connection between the USB host and a hub or a USB device, or a hub connected to another hub or USB device. The USB host contains host controllers that provide access to the USB devices in the system. FIG. 1 shows a schematic view of the USB architecture. For more detailed information, the reader is invited to review the "Universal Serial Bus Specification—Version 1.1" published Sep. 23, 1998. The USB cable can be thought of as a transmission line. Proper termination of a data transmission line is essential to prevent reflections on the transmission line that may interfere with data transfer, particularly at high speeds. In general, a transmission line is terminated with some sort of a load resistance. A load resistance is chosen to closely match the characteristic impedance of the transmission line in order to reduce reflections that may distort the data signals.

FIG. 2 shows the electrical schematic of a USB connection as specified in the USB 1.1 specification. On the host side of the connection, a transceiver 201 drives the two signaling lines D+ and D−. The transceiver 201 drives the data through a pair of impedance matching resistors $R_S$. The impedance matching resistors $R_S$ match the output impedance of the transceiver 201 drivers to the characteristic impedance of the twisted pair signaling lines D+ and D−.

Similarly, on the peripheral side of the USB cable, a transceiver 203 is provided for receiving and transmitting data signals. On the peripheral side, a pair of impedance matching resistors $R_S$ is also provided for matching the output impedance of the transceiver 203 with the characteristic impedance of the cable. Additionally, on the peripheral side of the cable, a pull-up resistor $R_{pu}$ is coupled between one of the signaling lines (in this case D+) and a voltage V (typically 3 to 3.6 volts). The pull-up resistor $R_{pu}$ is used to maintain proper voltage levels for data signals and to detect the presence or absence of the peripheral. All USB peripheral devices include such resistances. When the USB peripheral is connected to a host, the peripheral applies a voltage to the signaling line that permits the host to detect the presence of the USB peripheral. Typically, the value of the pull-up resistor $R_{pu}$ is 1.5 kΩ.

Additionally, pull-down resistors $R_{pd}$ are attached to each of the signaling lines D+ and D−. The pull-down resistors $R_{pd}$ are typically on the order of 15 kΩ. The purpose of the pull-down resistors $R_{pd}$ is to pull the signaling line to ground if the pull-up resistor $R_{pu}$ is disconnected. Therefore, the pull-down resistors $R_{pd}$ are used for disconnect detection.

As noted above, the pull up resistor $R_{pu}$ is used to maintain proper voltage levels on the signal lines. The pull up resistor $R_{pu}$ acts as a variable current source which injects anywhere between 200 microamps to 2.4 milliamps into the data line to which it is attached. The existing USB 1.1 specification requires the pull up resistor $R_{pu}$ to raise the line from 0 to 2.0 volts within 2.5 microseconds and maintain the line between 2.7 and 3.6 volts when the bus is quiescent. However, the use of the pull up resistor $R_{pu}$ requires valuable board area. Thus, it is desirable to that the pull up resistor $R_{pu}$ be removed.

Furthermore, existing USB connections have the capability of detecting when a USB device is disconnected. This is typically done by using the pull up resistor $R_{pu}$. This technique is impractical for enhanced high speed USB signal rates.

The design of the USB connection shown in FIG. 2 supports existing USB signaling rates. However, even higher signaling rates have been proposed. For the higher signaling rates, improved cable terminations must be provided. Additionally, the USB connection termination system and method must be backwards compatible, i.e. support current USB 1.1 signaling rates that are of lower speed. Furthermore, the enhanced USB connection should have the capability of detecting disconnects.

SUMMARY OF THE INVENTION

A method for detecting the disconnection of a peripheral device from a serial data bus is disclosed. First, a predetermined current is injected to the serial data bus in a data packet that is sent over the serial data bus. Then, the voltage level on the serial data bus is monitored.

BRIEF DESCRIPTION OF DRAWINGS

The present invention will be described in conjunction with the following Figures, wherein.

DETAILED DESCRIPTION OF THE INVENTION

Figure 1:
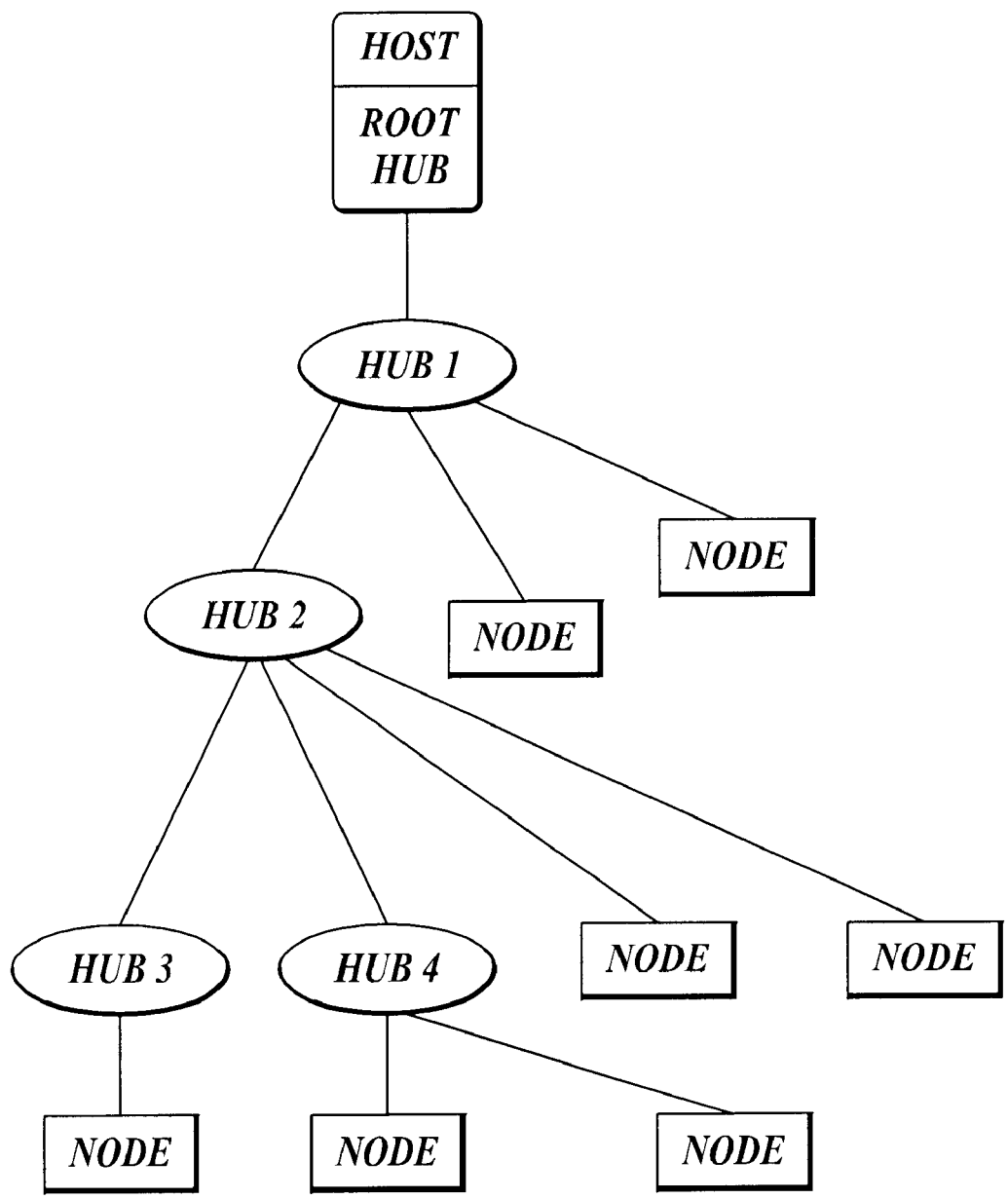
FIG. 1 is a schematic diagram of the tiered star topology used in the USB architecture.
Figure 2:
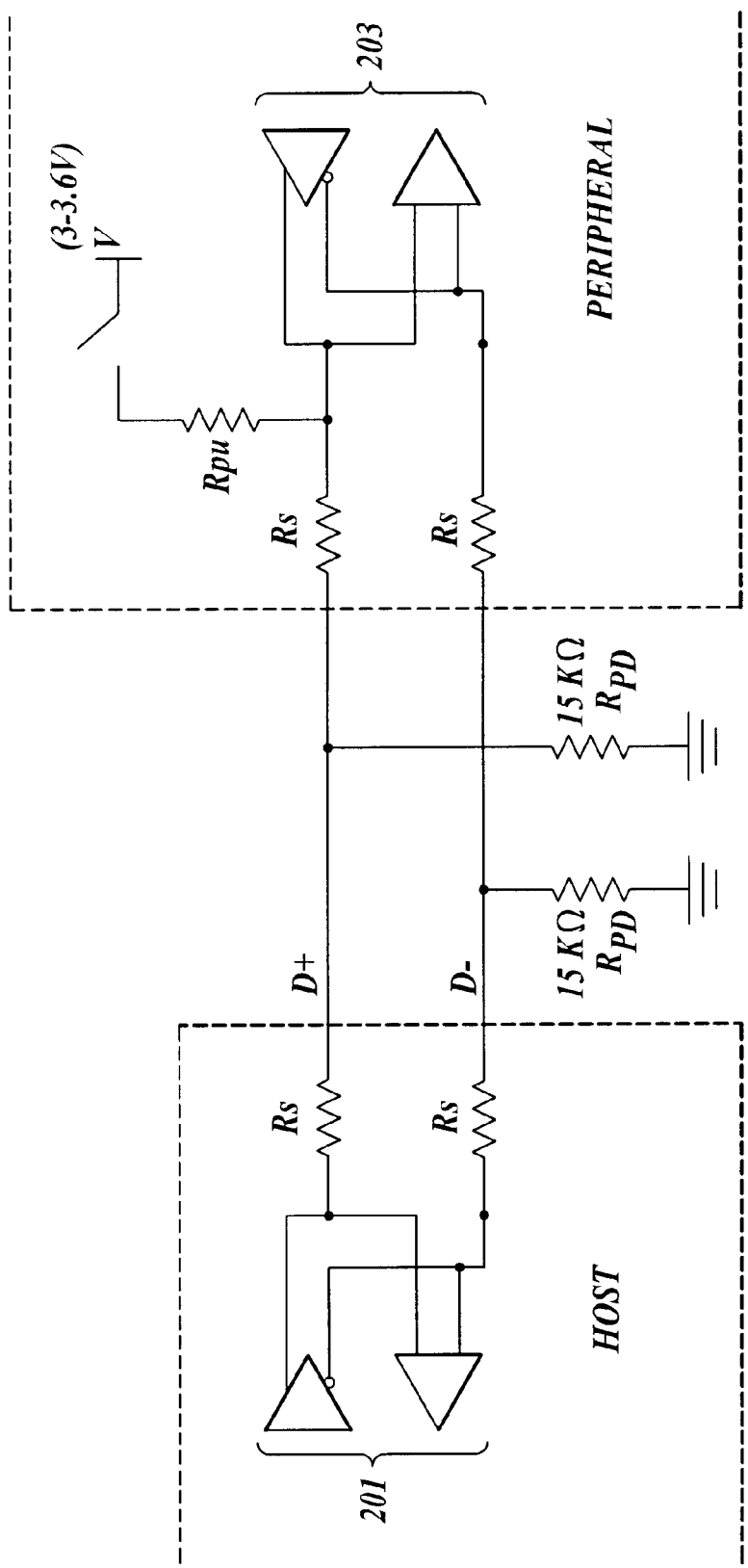
FIG. 2 is a schematic diagram of a prior art USB termination system and method.
Figure 3:
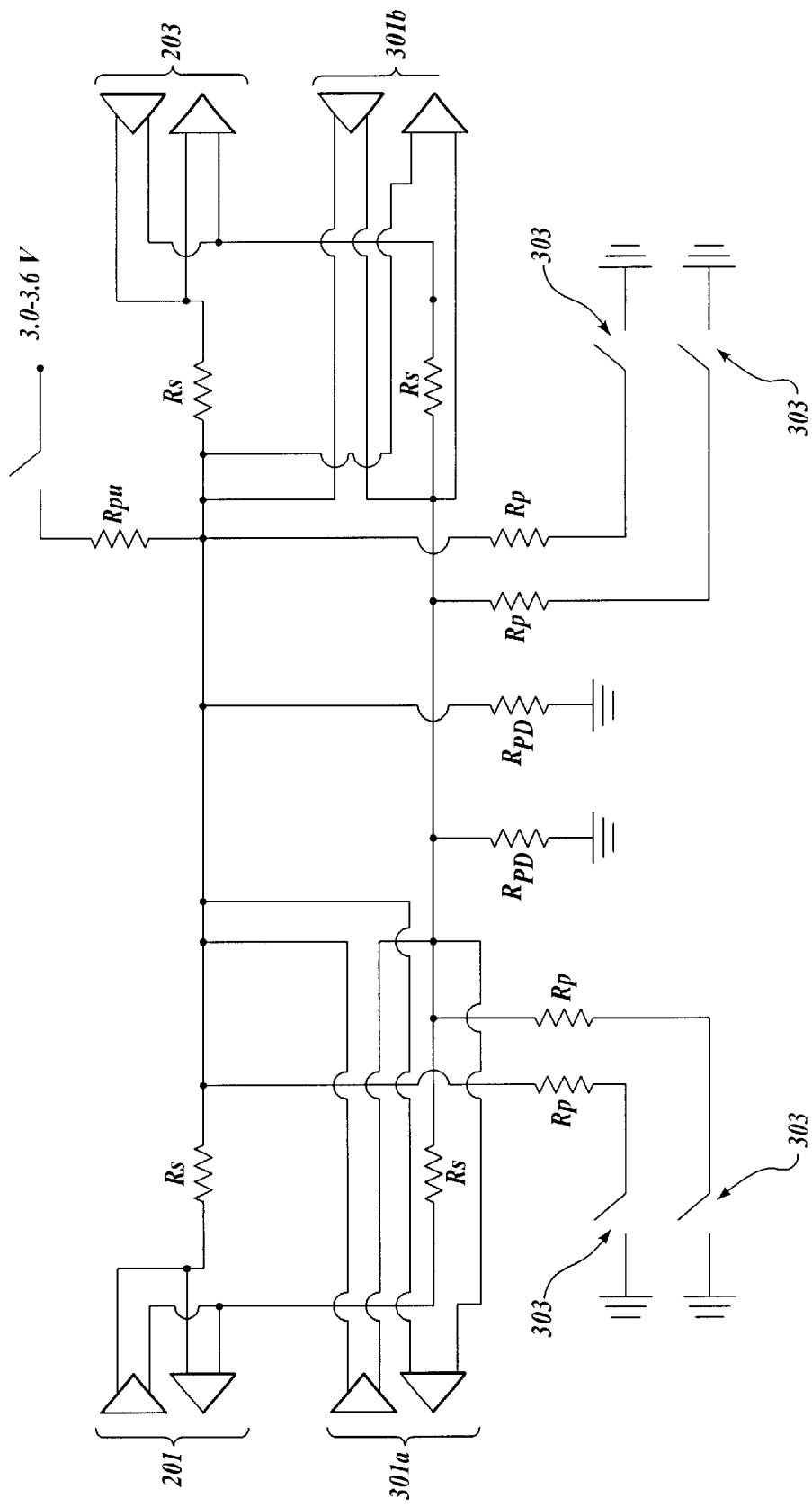
FIG. 3 is an embodiment according to the present invention, and more specifically, a schematic diagram of a USB cable and termination system.

FIG. 3 illustrates an electrical schematic of a USB connection and termination method formed in accordance with the present invention. FIG. 3 includes all of the components of FIG. 2 with the addition of two enhanced USB transceivers 301a and 301b. These enhanced USB transceivers 301 are supplemental to the existing USB transceivers 201 and 203 of FIG. 2. Note that the enhanced USB transceivers 301 are connected to the USB cable at points outside of the resistors $R_S$. When enhanced USB data transmission is desired, the enhanced USB transceivers 301a and 301b control the signaling. By the term "enhanced USB transceivers", it is meant a transceiver that can signal at a rate greater than 12 Mbits/second, and more preferably, 480 Mbits/second.

Additionally, at each termination of the USB cable, a pair of parallel resistors $R_p$ are connected to each of the two signaling lines D+ and D− respectively. Typically, the parallel resistors $R_p$ have a value of 45 ohms to match the characteristic impedance of the USB cable. The parallel resistors $R_p$ are connected to ground via switches 303. In operation, when the parallel resistors $R_p$ are disconnected via switches 303, the termination method of the USB cable is identical to USB 1.1 and provides full backwards compatibility. However, when the parallel resistors $R_p$ are all connected to ground via the switches 203, the termination requirements for enhanced USB signaling can be met and the USB connection can be used to carry high-speed data in accordance with enhanced USB protocol.

To understand how the parallel resistors $R_p$ allow for high speed operation, some background discussion on the current USB 1.1 specification is helpful. In USB 1.1, the signaling rate is limited by the propagation time of a bit of data from the USB host to the USB peripheral and back to the USB host. The USB 1.1 receiver at the USB peripheral is an open circuit at the end of the USB cable. The open circuit of the USB 1.1 receiver causes a reflection of the signal back to the transmitter at the USB host. In order to prevent interference with subsequently transmitted bits, the next bit of data must not be transmitted until the reflection from the receiver at the USB peripheral has been received back at the transmitter termination. This limits the rate at which USB 1.1 signaling can take place to 12 Mbits/second for a five meter USB cable.

With enhanced USB 2.0 signaling, the data rate is 480 Mbits/second. Clearly, at this signaling rate, multiple bits of data are on the USB cable at the same time. For example, for a five meter USB cable, there may be 15 bits of data along the USB cable at different physical locations on the USB cable (the D+ or D− line).

The reflection problem is eliminated by the addition of the parallel resistors $R_p$. Recall that in USB 1.1, the reflections caused by the open circuit of the receiver will limit the signaling rate. However, if the reflections can be eliminated, then the signaling rate can be increased. That is the principle of the present invention.

The parallel resistors $R_p$, having a nominal value of 45 ohms, match the characteristic impedance of the USB cable. Thus, when the parallel resistors $R_p$ are connected to ground through switch 303, there is no reflection of the signal, allowing for enhanced high speed USB 2.0 operation. In order to be backwards compatible with existing USB 1.1 devices, the switches 303 must be opened.

One advantage of the present invention is that dual terminations are used in the USB connection. In other words, a pair of parallel resistors $R_p$ are present at the transmitting end and at the receiving end. Because dual terminations attenuate reflections much more quickly than a single termination, the signaling can occur at much higher data rates. Moreover, a dual termination can be left connected to the USB cable for as long as the USB remains in its enhanced mode. Prior art attempts using a single far end termination must be switched in or out each time signaling on the bus reverses direction.

Moreover, in accordance with another aspect of the present invention, the pull up resistor $R_{pu}$ can be replaced by a current source. As previously noted, current USB devices indicate that they are connected to the USB by pulling up one of the USB's data lines with the 1.5 kΩ pull up resistor $R_{pu}$. The present invention replaces the $R_{pu}$ with a current source that can be placed on-die with the USB transceivers, saving the cost and board area of the pull up resistor $R_{pu}$ and allowing greater flexibility in the USB device's operation.

The pull up resistor $R_{pu}$ acts as a variable current source which injects anywhere from 200 microamps to 2.4 milliamps into the data line to which it is attached. The current USB 1.1 specification requires the pullup resistor $R_{pu}$ to raise the line from 0 to 2.0 volts within 2.5 microseconds and maintain the line between 2.7 and 3.6 volts when the bus is quiescent.

In accordance with the present invention, these requirements can also be met by a pair of current sources operating in parallel. One current source acts as a trickle supply, sourcing approximately 200 microamps to hold the data line at roughly 3 volts while the bus is idle. The other source acts as a boost supply, and provides the current needed to raise the data line from 0 to 2 volts within 2.5 microseconds. After the data line reaches some threshold voltage ($V_{co}$), the boost supply shuts off. In one preferred embodiment, the threshold voltage is 2 volts, though it may range from 1.7 to 2.7 volts. It can be appreciated that a wide variety of boost supply sizes and threshold voltages meet the required performance, provided the supply sources at least 600 microamps and does not shut off before 2 volts has been reached. The 600 microamps supply is dictated by the physical characteristics of the USB cable. The USB cable has a capacitance of roughly 750 picofarads. In order to raise the voltage on the line to 2 volts, about 1500 picocoulombs of charge needs to be transferred to the USB cable (from the relationship Q=CV). Further in order to accomplish this within 2.5 microseconds, 600 microamps of current needs to be supplied (from the relationship Current (I)=Charge(Q)/Time (T)).

Figure 4:
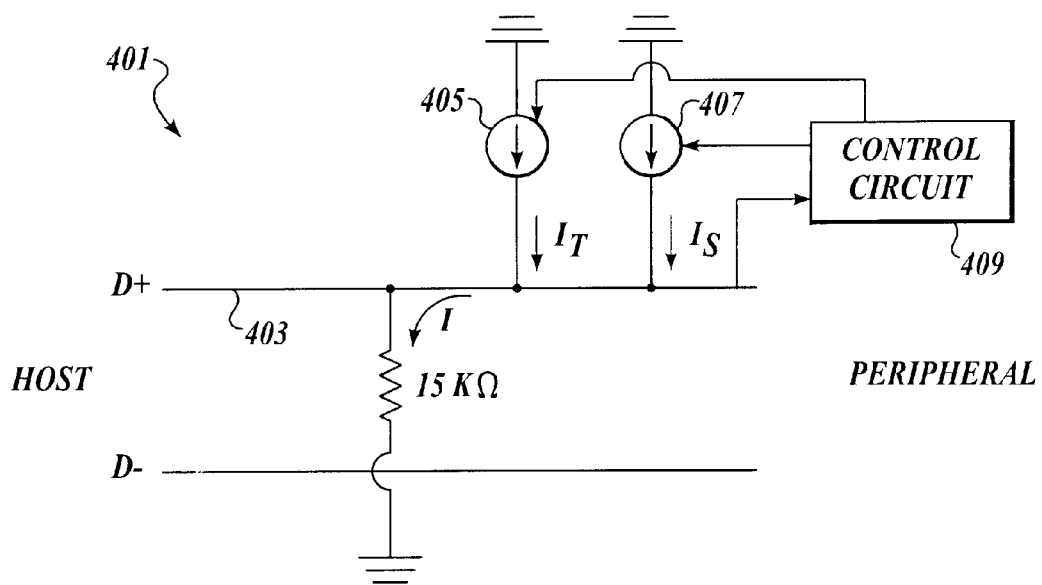
FIG. 4 is an embodiment according to the present invention, and more specifically, a schematic diagram of the current sources used to set the voltage on the signaling line for the USB cable.

A schematic of the enhanced USB cable 401 is shown in FIG. 4. As seen, the D+ data line 403 does not include the 1.5 kΩ pull up resistor. Rather, a trickle current source 405 outputting a current $I_t$ and a boost current source 407 outputting a current $I_b$ is shown attached to the data line 403. As noted above, the trickle current source 405 provides a constant 200 microamp current It onto the data line 403 when a USB device is connected to the USB cable. In other words, when a USB device is connected to the USB cable, a signal is sent to the trickle current source 405 to output its current $I_t$. The trickle current is that current necessary to pull up the data line 403 to between 3 and 3.6 volts as required by the USB 1.1 specification. The boost current is that current required to boost the voltage on data line 403 from 0 to 2 volts (or any other predetermined voltage) within 2.5 microseconds as required by the USB 1.1 specification. The boost current source 407 and the trickle current source 405 are controlled via control signals generated by a control circuit 409. In the preferred embodiment, the control circuit 409 is integrated to the USB device.

Figure 5:
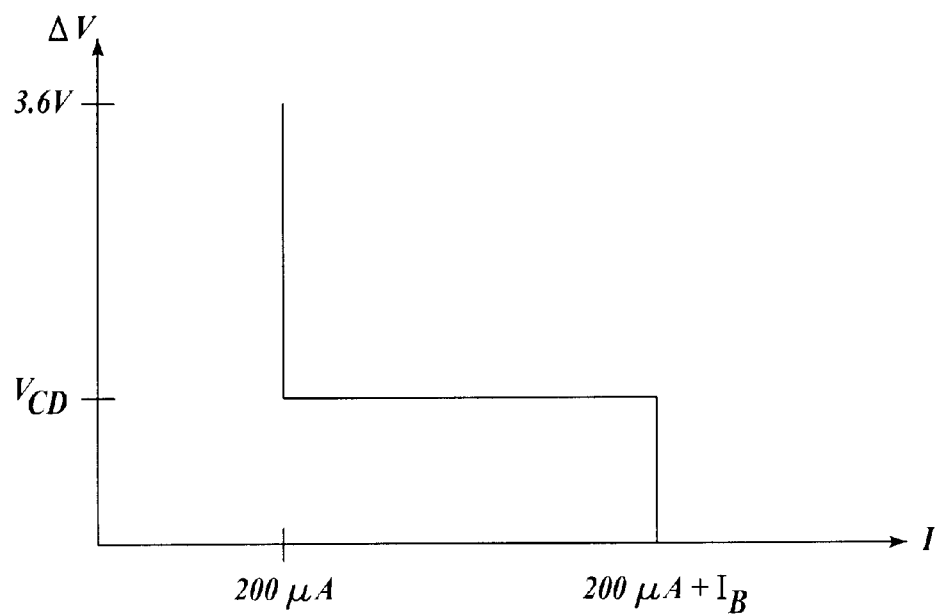
FIG. 5 is an embodiment according to the present invention, and more specifically, a voltage-current graph of the current sources of FIG. 4.

Additionally, when the USB device is initially connected to the USB cable, a control signal is sent by the control circuit 409 to the boost current source 407 to provide current at a high rate, e.g., 2.4 milliamps. When a predetermined voltage threshold is reached $V_{co}$, (as sensed by the control circuit 409), the control circuit 409 transmits a control signal instructing the boost current source 407 to shut off. FIG. 5 shows the combined current source V-I characteristic of the circuit.

The use of the current sources 405 and 407 provides several advantages over the prior art. First, the cost and board area of the pull up resistor $R_{pu}$ is eliminated which allows for greater flexibility in the USB device operation. Also, in many USB devices, the pull up resistor $R_{pu}$ is controlled by the USB device which requires a control pin. Replacing the external pull up resistor $R_{pu}$ with on-die components (as the current sources 405 and 407 would be) eliminates the cost of the resistor, and allows the control pin to be used for other functions. Alternatively, the package size may be reduced. This approach saves a control pin, eliminates a need for a voltage regulator that supplies the voltage for the pull up resistor $R_{pu}$, offers reduced parasitics, and provides a wider range of currents than the pull up resistor $R_{pu}$ As noted above, it is important to be able to detect when the USB device (peripheral) has been disconnected to the USB connection, particularly during high speed operation. Extending the current prior art USB disconnect detection scheme into the enhanced mode is impractical due to the parallel terminations shown in FIG. 3. However, the parallel terminations $R_p$ form a current divider with one leg on the USB hub or host and the other leg on the USB device. If the device is disconnected, all current driven by the host or the hub will pass through its termination, rather than half the current passing through each termination. As a result, the DC voltage on the data line nominally doubles from a predetermined nominal voltage when the device is disconnected. The predetermined nominal level is the voltage on the data line if the USB device 601 is connected, typically 400 millivolts.

Figure 6:
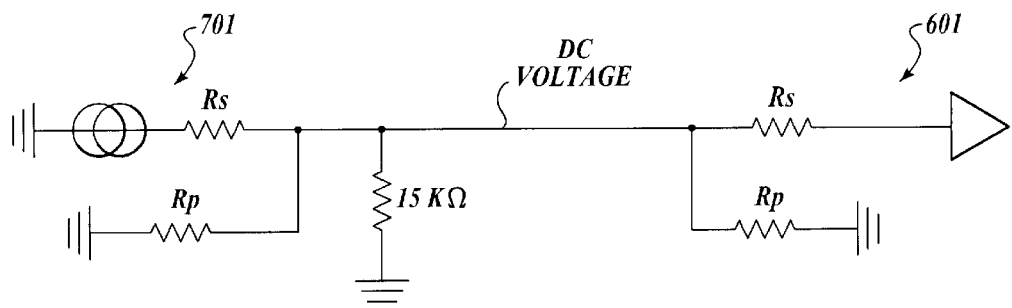
FIG. 6 is an embodiment according to the present invention, and more specifically, a schematic diagram of the signaling line for the USB cable when the USB cable is connected to a USB device.
Figure 7:
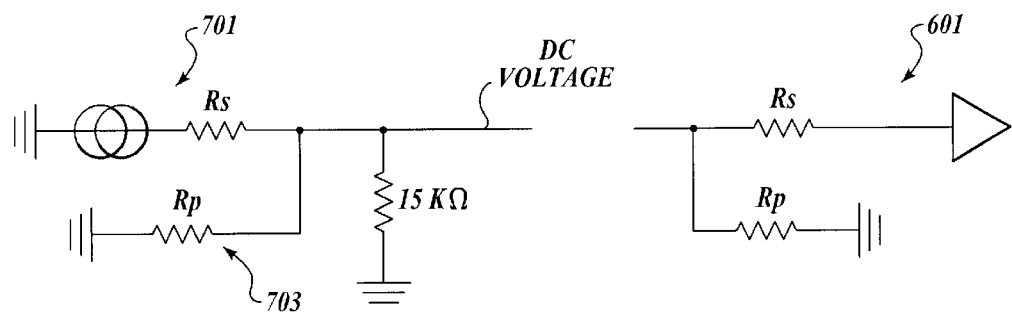
FIG. 7 is an embodiment according to the present invention, and more specifically, a schematic diagram of the signaling line for the USB cable when the USB cable is disconnected to a USB device.

As seen in FIG. 6, when the USB device 601 is connected, a current divider is formed and the DC voltage on the data line is at a nominal level. However, if as in FIG. 7, the USB device 601 is not connected, then the current driven by the host or the hub 701 will pass through a single termination resistor $R_p$ 703, thereby driving the data line to a voltage greater (theoretically twice the nominal level) than the nominal level if the USB device 601 is connected.

Thus, in order to detect a device disconnection, the enhanced USB hub or host 701 monitors the voltage on the data line for a higher than nominal voltage when the hub or host 701 drives the bus with a current signal. In particular, the USB 2.0 specification requires the use of a current source to inject current into the data line. In other words, in contrast to USB 1.1, the transmitter drives a current signal onto the USB cable, which is then transformed into a voltage that is applied to the data line. The current signal, after passing through the USB cable can be monitored/received by the USB peripheral as a voltage signal on the USB cable. Because of the high speed signaling, the current signal that is driven by the hub or host 701 should be at least 30 bits in length of all "1's" or all "0's". This allows for stabilization of the voltage along the entire length of the USB cable. In one preferred embodiment, the 30 bits are placed in a preexisting packet already required by USB 2.0. This packet is referred to as the start of frame (SOF) packet and is sent periodically by the USB hub or host 701 at 125 microsecond intervals. Other disconnect detection schemes for high speed enhanced USB attempt to circumvent the parallel terminations used in the present invention. This requires the introduction or use of other resources, increasing implementation cost and complexity above that required if the parallel terminations of the present invention are used. The method disclosed above consumes less power, bus bandwidth, and gates than other methods.

What is claimed is:

1. A method for detecting the disconnection of a device from a serial data bus, the method comprising:

injecting a predetermined current onto said serial data bus; and monitoring a voltage level on said bus, said device selectively providing impedance to said bus's lines when said device is connected to said bus.

2. The method of claim 1 further including the steps of:

if said voltage level is at a predetermined nominal level, determining that said device is connected to said bus; and if said voltage level is higher than said predetermined nominal level, determining that said device is not connected to said bus.

3. The method of claim 1 wherein said step of injecting said predetermined current is a plurality of bits in a data packet sent over said serial data bus.

4. The method of claim 3 wherein said data packet is a start of frame (SOF) data packet that is sent periodically.

5. A voltage pull up apparatus for a data line of a serial data bus comprising:

a pull down resistor connected to said data line;

a trickle current source attached to said data line; and a boost current source attached to said data line.

6. The apparatus of claim 5 further including a control circuit that transmits control signals to said trickle current source and said boost current source.

7. The apparatus of claim 5 such that said control circuit is integrated to a peripheral device adapted for connection to said serial data bus.

8. A method for pulling up a data line of a serial data bus comprising:

applying a constant trickle current using a trickle current source into said data line and through a pull down resistor; and applying a boost current using a boost current source into said data line and through said pull down resistor when a peripheral device is initially attached to said data line and until the voltage on said data line reaches a predetermined value.

9. The method of claim 8 such that said trickle current source and said boost current source are controlled by a control circuit.

10. The method of claim 9 such that said control circuit is integrated to a peripheral device adapted for connection to said serial data bus.

11. A serial data bus having a host termination and a peripheral termination, the serial data bus comprising:

a first data line;

a second data line;

a pair of host parallel resistors being connected to said first and second data lines at said host termination and being selectively couplable to ground; and a pair of peripheral parallel resistors being connected to said first and second data lines at said peripheral termination and being selectively couplable to ground.

12. A serial data bus having a host termination and a peripheral termination, the serial data bus comprising:

a first data line;

a second data line;

a pair of host parallel resistors being connected to said first and second data lines at said host termination;

a pair of peripheral parallel resistors being connected to said first and second data lines at said peripheral termination; and a plurality of switches to selectively switch said pair of host parallel resistors and said peripheral parallel resistors to ground.

13. A serial data bus having a host termination and a peripheral termination, said serial data bus including:

a first data line;

a second data line;

a pair of host parallel resistors being connected to said first and second data lines at said host termination, said host parallel resistors being connected to ground when in a first speed of operation;

a pair of peripheral parallel resistors being connected to said first and second data lines at said peripheral termination, said peripheral parallel resistors being connected to ground when in said first speed of operation;

a pull down resistor connected to said data line;

a trickle current source attached to said data line; and a boost current source attached to said data line.

14. The bus of claim 13 further including a control circuit that transmits control signals to said trickle current source and said boost current source.

15. The bus of claim 14 such that said control circuit is integrated to a peripheral device adapted for connection to said peripheral termination of said serial data bus.

16. The bus of claim 13 further including a plurality of switches for selectively switching said pair of host parallel resistors and said peripheral parallel resistors to ground.

17. An apparatus comprising:

a host device having a host transceiver;

a peripheral device having a peripheral transceiver; and a serial data bus connected between said host transceiver and said peripheral transceiver, said serial data bus including a host termination and a peripheral termination, said serial data bus comprising:

a first data line;

a second data line;

a pair of host parallel resistors being connected to said first and second data lines at said host termination and being selectively couplable to ground; and a pair of peripheral parallel resistors being connected to said first and second data lines at said peripheral termination and being selectively couplable to ground.

18. An apparatus comprising:

a host device having a host transceiver;

a peripheral device having a peripheral transceiver; and a serial data bus connected between said host transceiver and said peripheral transceiver, said serial data bus including a host termination and a peripheral termination, said serial data bus comprising:

a first data line;

a second data line;

a pair of host parallel resistors being connected to said first and second data lines at said host termination;

a pair of peripheral parallel resistors being connected to said first and second data lines at said peripheral termination; and a plurality of switches to selectively switch said pair of host parallel resistors and said peripheral parallel resistors to ground.

19. An apparatus comprising:

ahost device having a host transceiver;

a peripheral device having a peripheral transceiver; and a serial data bus connected between said host transceiver and said peripheral transceiver, said serial data bus including a host termination and a peripheral termination, said serial data bus comprising:

a first data line;

a second data line:

a pair of host parallel resistors being connected to said first and second data lines at said host termination, said host parallel resistors being connected to ground when in a first speed of operation;

a pair of peripheral parallel resistors being connected to said first and second data lines at said peripheral termination, said peripheral parallel resistors being connected to ground when in said first speed of operation;

a pull down resistor connected to said data line;

a trickle current source attached to said data line; and a boost current source attached to said data line.

* * * * *